United States Patent
Kim et al.

(10) Patent No.: US 10,737,231 B2
(45) Date of Patent: Aug. 11, 2020

(54) METHOD AND APPARATUS FOR MANUFACTURING AEROGEL SHEET

(71) Applicant: LG CHEM, LTD., Seoul (KR)

(72) Inventors: Ye Hon Kim, Daejeon (KR); Je Kyun Lee, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 155 days.

(21) Appl. No.: 15/738,495

(22) PCT Filed: Jan. 17, 2017

(86) PCT No.: PCT/KR2017/000580
§ 371 (c)(1),
(2) Date: Dec. 20, 2017

(87) PCT Pub. No.: WO2017/126870
PCT Pub. Date: Jul. 27, 2017

(65) Prior Publication Data
US 2018/0161744 A1    Jun. 14, 2018

(30) Foreign Application Priority Data

Jan. 19, 2016 (KR) .................. 10-2016-0006341

(51) Int. Cl.
*B01J 13/00* (2006.01)
*B65H 37/00* (2006.01)
(Continued)

(52) U.S. Cl.
CPC ....... *B01J 13/0091* (2013.01); *B01J 13/0056* (2013.01); *B01J 13/0082* (2013.01);
(Continued)

(58) Field of Classification Search
CPC .............. B01J 13/0091; B01J 13/0056; B01J 13/0082; C01B 33/158; C01B 33/141;
(Continued)

(56) References Cited

U.S. PATENT DOCUMENTS 5,789,075 A    8/1998    Frank et al.
6,319,852 B1   11/2001   Smith et al.
(Continued)

FOREIGN PATENT DOCUMENTS

CN    1839024      9/2006
CN    102557577    7/2012
(Continued)

OTHER PUBLICATIONS

XP-002782190, Database WPI Week 200881, AN2008-N96032, Thomson Scientific, London, GB—Summary of Application No. KR20070006276, published as KR100823071 (2017).
(Continued)

*Primary Examiner* — Anthony J Zimmer
(74) *Attorney, Agent, or Firm* — Dentons US LLP (57) ABSTRACT

A method for manufacturing an aerogel sheet according to the present invention includes: a step (a) of preparing a blanket having a plate shape; a step (b) of mixing silica sol with gelling catalyst to prepare a silica sol precursor; and a step (c) of injecting the silica sol precursor prepared in the step (b) to a surface of the blanket prepared in the step (a) through an injection device to gelate the silica sol precursor, wherein, in the step (c), the injection device injects the silica sol precursor while moving from one side to the other side of the surface of the blanket.

16 Claims, 3 Drawing Sheets

(51) Int. Cl.
*C01B 33/158* (2006.01)
*C01B 33/141* (2006.01)
*C01B 33/152* (2006.01)
*B65H 3/08* (2006.01)
*B41N 10/02* (2006.01)

(52) U.S. Cl.
CPC ............... *B41N 10/02* (2013.01); *B65H 3/08* (2013.01); *B65H 37/00* (2013.01); *C01B 33/141* (2013.01); *C01B 33/152* (2013.01); *C01B 33/158* (2013.01); *C01B 33/1585* (2013.01)

(58) Field of Classification Search
CPC ..... C01B 33/152; C01B 33/1585; B65H 3/08; B65H 37/00; B41N 10/02
See application file for complete search history.

(56) References Cited

U.S. PATENT DOCUMENTS

| | | | |
|---|---|---|---|
| 6,989,123 | B2 | 1/2006 | Lee et al. |
| 7,399,439 | B2 | 7/2008 | Lee et al. |
| 7,780,890 | B2 | 8/2010 | Lee et al. |
| 8,158,542 | B2 | 4/2012 | Werdecker et al. |
| 8,209,998 | B2 | 7/2012 | Werdecker et al. |
| 9,605,427 | B2 | 3/2017 | Besselievre et al. |
| 2005/0046086 | A1 | 3/2005 | Lee et al. |
| 2005/0167891 | A1 | 8/2005 | Lee et al. |
| 2006/0286813 | A1 | 12/2006 | Meredith et al. |
| 2007/0148407 | A1 | 6/2007 | Chen et al. |
| 2007/0148435 | A1 | 6/2007 | Meredith et al. |
| 2008/0093016 | A1 | 4/2008 | Lee et al. |
| 2008/0292889 | A1 | 11/2008 | Harvey et al. |
| 2009/0266110 | A1 | 10/2009 | Werdecker et al. |
| 2011/0223329 | A1 | 9/2011 | Meredith et al. |
| 2011/0240907 | A1 | 10/2011 | Sharma et al. |
| 2012/0114847 | A1 | 5/2012 | Werdecker et al. |
| 2013/0296596 | A1 | 11/2013 | Suh et al. |
| 2014/0252263 | A1 | 9/2014 | Besselievre et al. |
| 2016/0264427 | A1 | 9/2016 | Oh et al. |

FOREIGN PATENT DOCUMENTS

| | | |
|---|---|---|
| CN | 204018155 | 12/2014 |
| EP | 2930147 | 10/2015 |
| JP | 2000128372 | 5/2000 |
| JP | 2006227596 | 8/2006 |
| JP | 2007177328 | 7/2007 |
| JP | 2007524528 | 8/2007 |
| JP | 2008195851 | 8/2008 |
| JP | 2010504901 | 2/2010 |
| JP | 2011136859 | 7/2011 |
| JP | 2011190551 | 9/2011 |
| JP | 2014532031 | 12/2014 |
| JP | 2016017255 | 2/2016 |
| KR | 10-0823071 | 4/2008 |
| KR | 10-2011-0082379 | 7/2011 |
| KR | 10-2011-0126381 | 11/2011 |
| KR | 10-1105436 | 1/2012 |
| KR | 10-2012-0012836 | 2/2012 |
| KR | 10-2012-0070948 | 7/2012 |
| KR | 10-1199958 | 11/2012 |
| KR | 10-2013-0123942 | 11/2013 |
| KR | 10-2014-0146814 | 12/2014 |
| KR | 10-2015-0089319 | 8/2015 |
| KR | 10-2015-0090320 | 8/2015 |
| WO | 2010080237 | 7/2010 |
| WO | 2014126490 | 8/2014 |

OTHER PUBLICATIONS

Extended Search Report of European Patent Office in Appl'n No. EP17741636, dated Jun. 29, 2018.
Office Action of Japanese Patent Office in Appl'n No. 2018-520141 dated Apr. 16, 2019.
International Search Report of PCT/KR2017/000580, dated Apr. 17, 2017.
Office Action of Chinese Patent Office in Appl'n No. 201780002352.2 dated Dec. 30, 2019.
Office Action of the Japanese Patent Office in Appl' No. 2018-520141 dated Jan. 7, 2020.

METHOD AND APPARATUS FOR MANUFACTURING AEROGEL SHEET

CROSS-REFERENCE TO RELATED APPLICATION

This application is a National Stage Application of International Application No. PCT/KR2017/000580 filed on Jan. 17, 2017, which claims priority to and the benefit of Korean Patent Application No. 10-2016-0006341, filed on Jan. 19, 2016, both of which are incorporated herein in their entirety by reference for all purposes as if fully set forth herein.

TECHNICAL FIELD

The present invention relates to a method and apparatus for manufacturing an aerogel sheet, and more particularly, to a method and apparatus for manufacturing an aerogel sheet having excellent heat insulation and durability and having a uniform thickness.

BACKGROUND ART

In general, aerogel is a high porosity material having high porosity of about 90% to about 99% in solids that are known up to date. A silica precursor solution is subjected to sol-gel polymerization reaction to from gel, and then, drying process is performed on the formed gel under supercritical or atmospheric conditions to obtain the aerogel. That is, aerogel has a pore structure filled with air.

The above-described aerogel is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m.k or less, which is significantly lower than thermal conductivity of 36 mW/m.k that is thermal conductivity of an organic insulation material such as conventional Styrofoam and the like.

However, the aerogel according to the related art has problems that the sheet has nonuniform thickness and poor heat insulation and durability.

DISCLOSURE OF THE INVENTION

Technical Problem

The present invention has been made to solve the above-mentioned problems, and an object of the prevent invention is to provide a method and apparatus for manufacturing an aerogel sheet having excellent heat insulation and durability and having a uniform thickness.

Technical Solution

To achieve the above-described object, a method for manufacturing an aerogel sheet according to a first embodiment of the present invention includes: a step (a) of preparing a blanket having a plate shape; a step (b) of mixing silica sol with gelling catalyst to prepare a silica sol precursor; and a step (c) of injecting the silica sol precursor prepared in the step (b) to a surface of the blanket prepared in the step (a) through an injection device to gelate the silica sol precursor, wherein, in the step (c), the injection device injects the silica sol precursor while moving from one side to the other side of the surface of the blanket.

The step (a) may include a loading step loading the blanket having the plate shape in a storage vessel, a transfer step adsorbing the plate-shaped blanket loaded in the storage vessel to transfer the blanket, and a preparation step of inserting the blanket transferred by the transfer part into a fixing vessel, and the silica sol precursor may be injected to a surface of the blanket inserted into the fixing vessel through the injection device.

In the step (b), tetraethyl orthosilicate (TEOS) and ethanol may be mixed to prepare the silica sol.

The tetraethyl orthosilicate (TEOS) may include hydrolyzed TEOS.

In the step (b), ethanol and ammonia water ($NH_4OH$) may be mixed to prepare the gelling catalyst.

In the step (b), the silica sol and the gelling catalyst may be mixed through the mixing device, the mixing device may include a silica sol accommodation part in which the silica sol is accommodated, a catalyst accommodation part in which the gelling catalyst is accommodated, and a mixing part in which the silica sol of the silica sol accommodation part and the gelling catalyst of the catalyst accommodation part are introduced and mixed to prepare the silica sol precursor, and the silica sol precursor accommodated in the mixing part may be supplied to the injection device.

In the step (b), the injection device may include an injection part injecting the silica sol precursor to the surface of the blanket and a moving part moving the injection part from one side to the other side of the surface of the blanket.

In the step (c), the injection device may include a scraper uniformly adjusting a thickness of the silica sol precursor injected to the surface of the blanket.

After in the step (c), the method may further include a step of aging the blanket in which the silica sol precursor is gelated.

In the step (d), the blanket in which the silica sol precursor is gelated may be aged at a temperature of 70° C. and aged for 50 minutes.

In the sheet aging step (d), the blanket in which the silica sol precursor is gelated may be left at room temperature for 10 minutes to perform the aging.

After the step (d), the method may further include a step (e) of injecting a coating solution to the aged blanket to modify a surface of the blanket.

In the step (e), the coating solution may be prepared by mixing ethanol with ammonia water ($NH_4OH$).

In the step (e), the coating solution may be injected with 1.6 times of the silica sol impregnated into the surface of the blanket, and the aging may be performed at a high temperature of 70° C. for one hour in a reaction vessel to modify the surface of the blanket by using hexamethyldisilazane (HMDS).

After the step (e), the method may further include a step (f) of drying the blanket of which the surface is modified.

The step (f) may include a first drying step of injecting carbon dioxide at a rate of 70 L/min for ten minutes under environments of a temperature of 28° C. and a pressure of 70 bar to dry the blanket of which the surface is modified, a second drying step of raising to a temperature of 50° C. for 1 hour and 20 minutes to dry the blanket, a third drying step of injecting carbon dioxide at a rate of 0.7 L/min for 20 minutes under a temperature of 50° C. and a pressure of 150 bar to dry the blanket again, and a fourth drying step of injecting carbon dioxide at a rate of 0.7 L/min for 20 minutes after breaking for 20 minutes to dry the blanket.

In the third drying step of the step (f), the ethanol generated from the sheet of which the surface is modified may be collected while injecting the carbon dioxide.

The step (f) may further include a step of discharging the carbon dioxide for 2 hours after the fourth drying step.

The steps (d), (e), and (f) may be performed in a reaction vessel accommodating the blanket.

A manufacturing apparatus for performing the method for manufacturing the aerogel sheet according to the first embodiment of the present invention includes: a preparation device including a storage vessel in which plate-shaped blankets are loaded, a transfer part adsorbing the blankets loaded in the storage vessel to transfer the blankets, and a fixing vessel into which the blankets transferred by the transfer part are inserted; a mixing device including a silica sol accommodation part in which silica sol is accommodated, a catalyst accommodation part in which a gelling catalyst is accommodated, and a mixing part in which the silica sol of the silica sol accommodation part and the gelling catalyst of the catalyst accommodation part are introduced and mixed to prepare a silica sol precursor; an injection device including an injection part injecting the silica sol precursor supplied from the mixing part to a surface of a blanket inserted into the fixing vessel and a moving part moving the injection part from one side to the other side of the surface of the blanket part; and a reaction vessel which accommodates the blanket, in which the mixture is gelated, and in which the accommodated blanket is aged, surface-modified by injecting a coating solution, or dried at a high temperature.

Advantageous Effects

The present invention has effects as follows.

First: the present invention may use the method for manufacturing the aerogel sheet to manufacture the aerogel sheet having the superior insulation and durability.

Second: in the method for manufacturing the aerogel sheet according to the present invention, the tetraethyl orthosilicate (TEOS) and the ethanol may be mixed to manufacture the silica sol having the high quality.

Third: in the method for manufacturing the aerogel sheet according to the present invention, the hydrolyzed TEOS may be used to obtain the silica sol having the high quality.

Fourth: in the method for manufacturing the aerogel sheet according to the present invention, the ethanol and the ammonia water ($NH_4OH$) may be mixed to prepare the gelling catalyst having the high quality.

Fifth: In the method for manufacturing the aerogel sheet according to the present invention, the aerogel precursor may be injected while moving from one side to the other side of the surface of the blanket to induce the stable impregnation and gelation.

Sixth: the apparatus of manufacturing the aerogel sheet according to the present invention may include the scraper to uniformly adjust the thickness of the silica sol precursor.

Seventh: in the method for manufacturing the aerogel sheet according to the present invention, the blanket in which the silica sol is gelated may be aged, surface-modified, and dried to manufacture the aerogel sheet having the high quality.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 1:
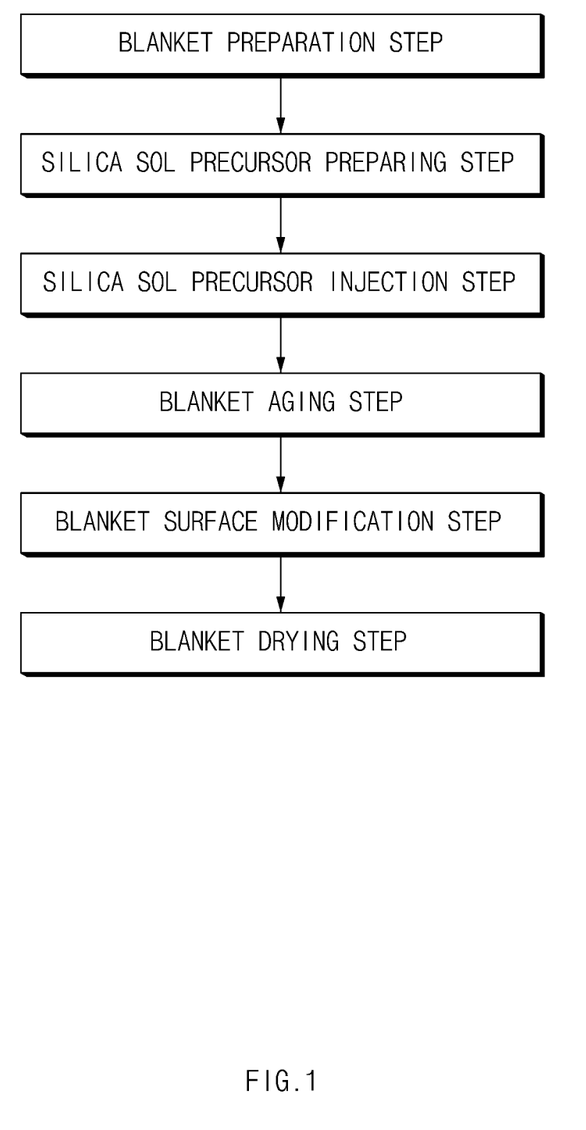
FIG. 1 is a flowchart illustrating a method for manufacturing an aerogel sheet according to the present invention.
Figure 2:
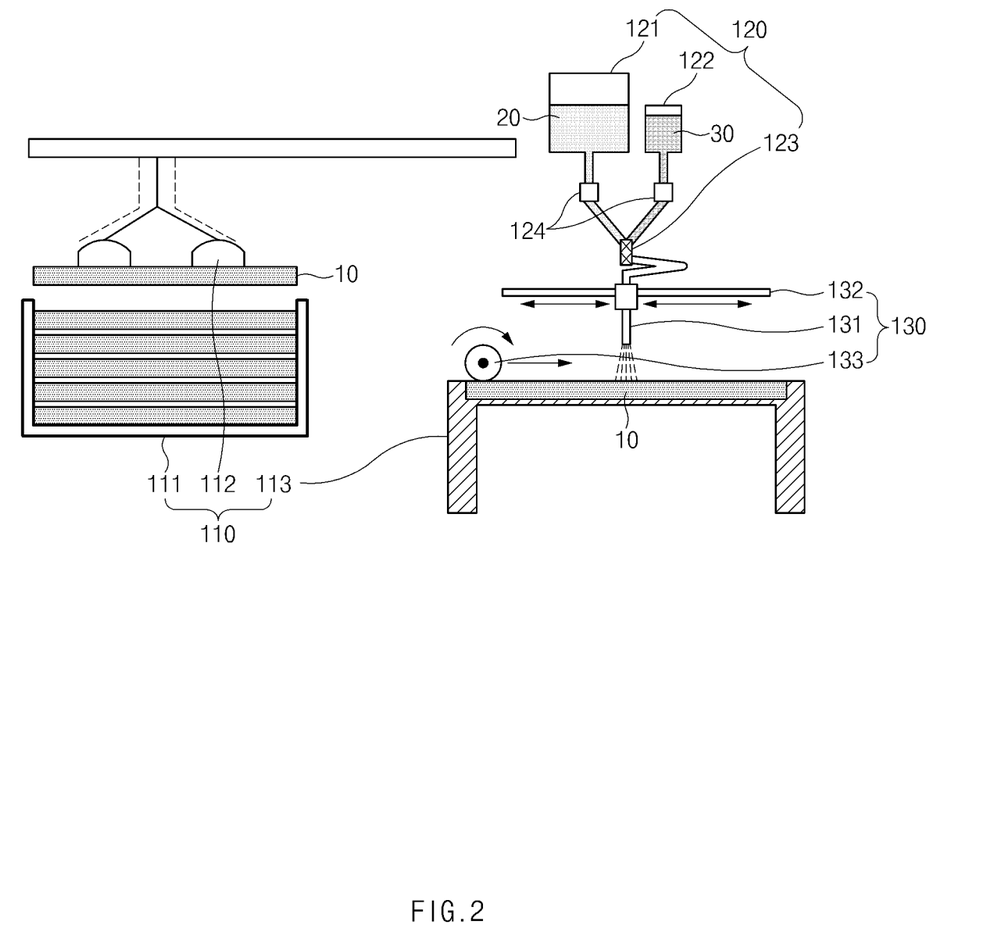
FIG. 2 is a view illustrating an apparatus of manufacturing the aerogel sheet according to the present invention.

An apparatus 100 of manufacturing an aerogel sheet according to the present invention includes, as illustrated in FIG. 2, a preparation device 110 preparing a blanket 10, a mixing device 120 mixing silica sol 20 with a gelling catalyst 30 to prepare a silica sol precursor, an injection device 130 injecting the silica sol precursor mixed by the mixing device 120 to a surface of the blanket 10 prepared by the preparation device 110 to gelate the silica sol precursor, and a reaction vessel 140 in which the blanket 10, in which the silica sol precursor is gelated, is aged, surface-modified by using injecting a coating solution, and dried at a high temperature.

The preparation device 110 is configured to prepare the blanket 10 having a plate shape. The preparation device 110 includes a storage vessel 111 in which the plate-shaped blankets 10, each of which is cut by a predetermined size, are vertically loaded, a transfer part 112 adsorbing the uppermost blanket 10 of the loaded blankets 10 to transfer the blanket 10 to the outside, and a fixing vessel 113 having an insertion groove that is opened upward so that the blanket 10 transferred by the transfer part 112 is inserted into the insertion groove.

The storage vessel 111 has a loading space which is opened upward and in which the blankets 10 are vertically loaded. Here, the storage vessel 111 may be provided with an elevation member for uniformly maintaining a height of the uppermost blanket 10 of the blankets 10 loaded in the loading space.

The transfer part 112 includes an adsorption piece absorbing the uppermost blanket 10 of the blankets loaded in the storage vessel 111 to lift the uppermost blanket 10 to the outside of the storage vessel 111 and a moving rail moving the adsorption piece up to a fixing vessel 113. When the adsorption piece is disposed on a top surface of the fixing vessel 111, the adsorbed blanket 10 drops down to be seated on the top surface of the fixing vessel 113.

Here, when the gelation of the silica sol precursor injected to the surface of the blanket 10 is completed, the transfer part 112 may transfer the gelated blanket 10 up to the reaction vessel 140 after adsorbing the blanket 10. Thus, continuity of work may be obtained. Alternatively, the gelated blanket 10 may be adsorbed and transferred up to the reaction vessel 140 through a separate transfer part.

The fixing vessel 113 has the insertion groove in a top surface thereof so that the blanket 10 is inserted, and the insertion groove has a sealed structure to prevent a mixture injected to the blanket 10 from leaking.

The mixing device 120 includes a silica sol accommodation part 121 in which the silica sol 20 is accommodated, a catalyst accommodation part 122 in which the gelling catalyst is accommodated, and a mixing part 123 in which the silica sol 20 of the silica sol accommodation part 121 and the gelling catalyst 30 of the catalyst accommodation part 122 are introduced and mixed to prepare the silica sol precursor.

Here, a control value 124 may be provided in the connection line connecting the mixing part 123 to the silica sol accommodation part 121 or a connection line. The control valve 124 may control an inflow rate of the silica sol 20 or the gelling catalyst 30, which is introduced into the mixing part 123.

Also, an agitating wing for improving mixing efficiency of the silica sol 20 and the gelling catalyst 30 may be provided in the mixing part 123.

The injection device 130 includes an injection part 131 injecting the silica sol precursor supplied from the mixing part 123 to the surface of the blanket 10 and a moving part 132 fixing the injection part 131 to an upper side of the blanket 10 so that the injection part 131 is movable from one side to the other side of the top surface of the blanket 10.

That is, in the injection device 130, the injection part 131 may inject the silica sol precursor while moving from one side to the other side of the surface of the blanket 10 by the moving part 132. Thus, the silica sol precursor may be uniformly injected to the surface of the blanket 10.

Here, the injection device 130 may further include a scraper 133 for more precisely adjusting a thickness of the silica sol precursor injected to the surface of the blanket 10. That is, the scraper 133 is installed on the top surface of the fixing vessel 113 so as to be movable from one side to the other side. The scraper 133 pushes and removes the silica sol precursor having a predetermined height or more in the mixture on the surface of the inserted blanket 10 of the fixing vessel 113 while moving from one side to the other side of the fixing vessel 113 to more precisely uniformly adjust a height of the silica sol precursor.

Figure 3:
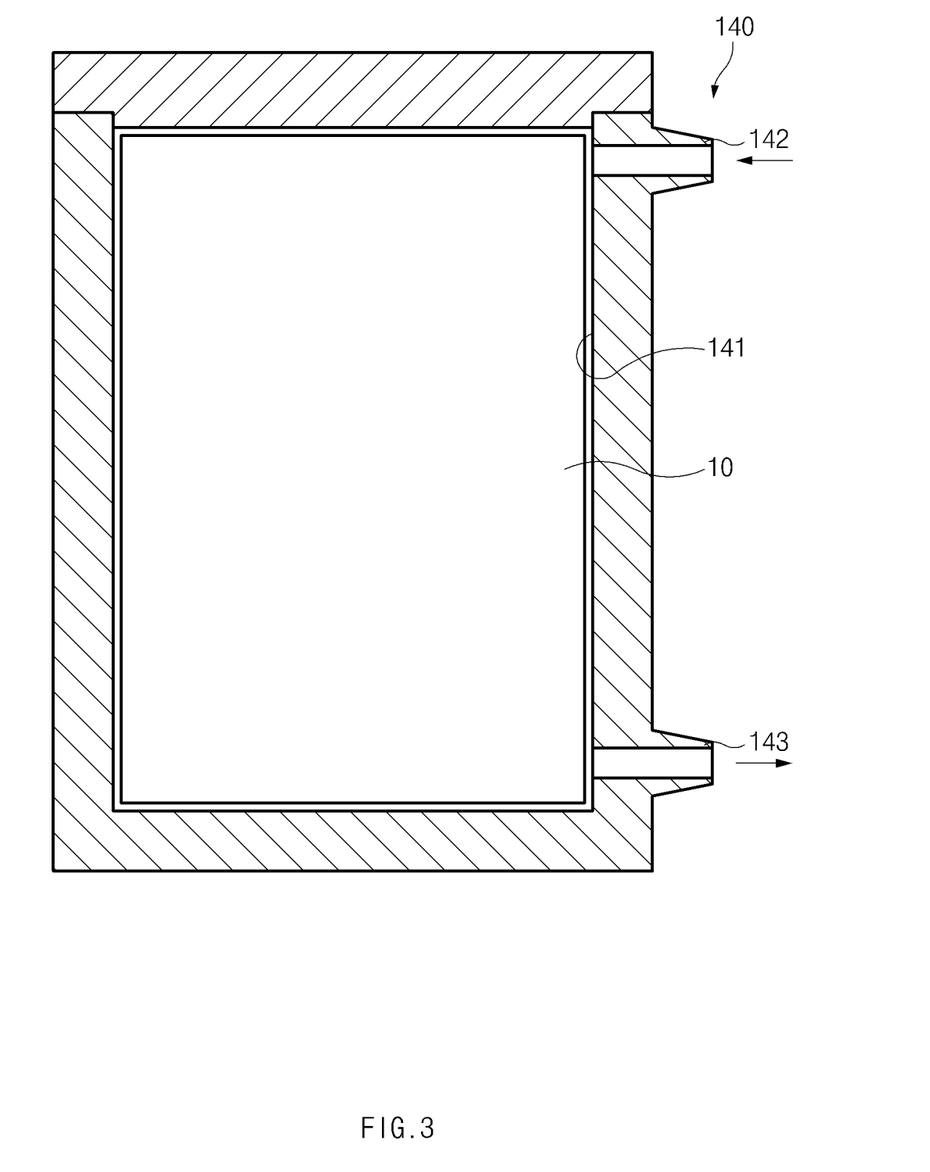
FIG. 3 is a view of a reaction vessel provided in the apparatus for manufacturing the aerogel sheet according to the present invention.

As illustrated in FIG. 3, the reaction vessel 140 has an accommodation space 141 in which the blanket 10, in which the silica sol precursor is gelated, is accommodated to be sealed, an injection hole 142, through which an object is injected into the accommodation space 141, in one end, and a discharge hole 143, through which the object in the accommodation space 141 is discharged, in the other end.

That is, in the reaction vessel 140, a coating solution is injected into the accommodation space 141 through the injection hole 141, and carbon dioxide remaining in the accommodation space 141 is discharged through the discharge hole 143.

The apparatus of manufacturing the aerogel sheet, which includes the above-described constituents, according to the present invention may be used to obtain the aerogel sheet having superior heat insulation and durability.

Hereinafter, a manufacturing method using the apparatus of manufacturing the aerogel sheet according to the present invention will be described.

A method for manufacturing an aerogel sheet according to the present invention includes, as illustrated in FIG. 2, a step (a) of preparing a blanket having a plate shape, a step (b) of mixing silica sol with gelling catalyst to prepare a silica sol precursor, a step (c) of injecting the silica sol precursor prepared in the step (b) to a surface of a blanket through an injection device to gelate the silica sol precursor, a step (d) of aging the blanket in which the silica sol precursor is gelated, a step (e) of injecting a coating solution to the aged blanket to modify a surface of the blanket, and a step (f) of drying the blanket of which the surface is modified.

(a) Blanket Preparation Step

In the blanket preparation step (a), the plate-shaped blanket cut by a predetermined size is prepared by using a preparation device 110 so that the silica sol precursor is injected. That is, the blanket preparation step (a) includes a loading step of loading the plate-shaped blankets, each of which is cut by the predetermined size, in a storage vessel 111, a transfer step of adsorbing the uppermost blanket 10 of the plate-shaped blankets 10 loaded in the storage vessel 111 by using a transfer part 112 to transfer the uppermost blanket 10 up to a fixing vessel 113, and a preparation step of dropping down the blanket 10 transferred by a transfer part 112 to insert the blanket 10 into an insertion groove of a fixing vessel 113.

(b) Silica Sol Precursor Preparing Step

In the silica sol precursor preparing step (b), the silica sol 20 and the gelling catalyst 30 are mixed by using a mixing device 120 to prepare the silica sol precursor.

Here, the silica sol 20 may be prepared by mixing tetraethyl orthosilicate (TEOS) with ethanol. For example, 1.2 kg of TEOS and 2.7 kg of ethanol are provided in a reaction bath (not shown) to prepare the silica sol. A hydrolyzed solvent having high reactivity with water may be used as the TEOS to improve reactivity. That is, the hydrolyzed TEOS and the ethanol may be mixed to obtain the silica sol having excellent reactivity.

Also, the gelling catalyst 30 is prepared by mixing ethanol with ammonia water ($NH_4OH$). For example, 0.5 kg of ethanol and 30 ml of ammonia water ($NH_4OH$) are mixed in the reaction bath (not shown) to prepare the gelling catalyst.

The silica sol 20 and the gelling catalyst 30, which are prepared as described above, are introduced and stored into the silica sol accommodation part 121 and the catalyst accommodation part 122, respectively. The silica sol 20 and the gelling catalyst 30, which are respectively accommodated in the silica sol accommodation part 121 and the catalyst accommodation part 122, are introduced into the mixing part and mixed to prepare the silica sol precursor. That is, the silica sol precursor is accommodated in the mixing part 123 and then supplied to the injection device 130 to perform the silica sol precursor gelation step (c).

(c) Silica Sol Precursor Gelation Step

In the silica sol precursor gelation step (c), the silica sol precursor is injected to the surface of the blanket 10 inserted into the fixing vessel 113 by using the injection device 130 to gelate the silica sol precursor. That is, in the silica sol precursor gelation step (c), the silica sol precursor is injected to the surface of the blanket 10 by using the injection part 131. Here, the injection part 131 may inject the silica sol precursor while moving from one side to the other side of the surface of the blanket 10 by the moving part 132 to gelate the silica sol precursor.

When the gelation of the blanket 10 is completed, the aging step (d), the surface modification step (e), and the drying step (f) are performed to manufacture the aerogel sheet. Here, a reaction vessel 140 is used.

(d) Blanket Aging Step

In the blanket aging step (d), the blanket 10 in which a mixture is gelated is aged. That is, the blanket 10 in which the silica sol precursor is gelated is accommodated in the accommodation space 141 of the reaction vessel 140, and then, the reaction vessel 140 is heated up to a temperature of 70° C. and aged for 50 minutes to uniformize tissues of the blanket 10.

Here, in the blanket aging step (d), the blanket is left at room temperature (or a temperature of 25° C. for 10 minutes before the aging is performed in the reaction vessel 140.

Thus, the aging may be performed after inducing the stable gelation of the silica sol precursor to more uniformize the tissues of the blanket 10.

(e) Blanket Surface Deformation Step

In the blanket surface modification step (e), a coating solution is injected to the aged blanket 10 to modify the surface of the blanket 10. That is, in the blanket surface modification step (e), ethanol and ammonia water ($NH_4OH$) are mixed to prepare the coating solution. Then, the coating solution is introduced into the accommodation space 141 through the injection hole 142 of the reaction vessel 140 in which the blanket 10 is inserted. Here, the coating solution is injected with 1.6 times of the silica sol injected to the surface of the blanket, and the aging is performed at a high temperature of 70° C. for one hour in the reaction vessel 140 to modify the surface of the blanket 10 by using hexamethyldisilazane (HMDS).

(f) Blanket Drying Step

In the blanket drying step (f), the blanket 10 of which the surface is modified is dried to complete a silica gel sheet. Here, in the blanket drying step (f), supercritical drying is performed in the state in which the blanket 10 is accommodated in the reaction vessel 140. For example, the sheet drying step (f) includes a first drying step of injecting carbon dioxide at a rate of 70 L/min for ten minutes under environments of a temperature of 28° C. and a pressure of 70 bar to dry the blanket 10, a second drying step of raising to a temperature of 50° C. for 1 hour and 20 minutes to dry the blanket 10, a third drying step of injecting carbon dioxide at a rate of 0.7 L/min for 20 minutes again under a temperature of 50° C. and a pressure of 150 bar to dry the blanket 10, and a fourth drying step of injecting carbon dioxide at a rate of 0.7 L/min for 20 minutes after breaking for 20 minutes to dry the blanket 10.

Thus, the blanket 10 may increase in dryness factor.

In the third drying step of the sheet drying step (f), ethanol is generated in the reaction vessel 140 by chemical reaction between carbon dioxide and the sheet 1, and the ethanol generated in the reaction vessel 140 is discharged through the discharge hole 143 and then is collected.

Also, the blanket drying step (f) includes a discharging step of discharging the carbon dioxide for 2 hours after the fourth drying step. Thus, a gradual environmental change is induced in the blanket 10 to uniformize the tissues of the blanket 10. When the step (f) is completed, the aerogel sheet having the heat insulation and durability may be obtained.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing an aerogel sheet, the method comprising:
a step (a) of preparing a blanket having a plate shape;
a step (b) of mixing a silica sol with a gelling catalyst to prepare a silica sol precursor;
a step (c) of injecting the silica sol precursor prepared in the step (b) to a surface of the blanket prepared in the step (a) through an injection device to gelate the silica sol precursor,
wherein, in the step (c), the injection device injects the silica sol precursor while moving from a first side to an opposite second side in a width direction or a length direction of the surface of the blanket to uniformly inject the silica sol precursor to the surface of the blanket, and the injection device comprises a scraper for uniformly adjusting a thickness of the silica sol precursor injected to the surface of the blanket;
a step (d) of aging the blanket in which the silica sol precursor is gelated;
a step (e) of injecting a coating solution to the aged blanket to modify a surface of the blanket; and
a step (f) of drying the blanket of which the surface is modified to yield the aerogel sheet.

2. The method of claim 1, wherein:
the step (a) comprises:
loading the blanket having the plate shape in a storage vessel;
transferring the plate-shaped blanket from the storage vessel to a fixing vessel using a transfer part; and
inserting the blanket transferred by the transfer part into the fixing vessel.

3. The method of claim 1, wherein, in the step (b), the silica sol is prepared by mixing tetraethyl orthosilicate (TEOS) and ethanol.

4. The method of claim 3, wherein the tetraethyl orthosilicate (TEOS) comprises hydrolyzed TEOS.

5. The method of claim 1, wherein, in the step (b), the gelling catalyst is prepared by mixing ethanol and ammonia water ($NH_4OH$).

6. The method of claim 1, wherein, in the step (b), the silica sol and the gelling catalyst are mixed by passing through a mixing device, the mixing device comprising a silica sol accommodation part in which the silica sol is accommodated, a catalyst accommodation part in which the gelling catalyst is accommodated, and a mixing part in which the silica sol of the silica sol accommodation part and the gelling catalyst of the catalyst accommodation part are introduced and mixed to prepare the silica sol precursor, and the silica sol precursor accommodated in the mixing part is supplied to the injection device.

7. The method of claim 1, wherein, in the step (c), the injection device comprises:
an injection part injecting the silica sol precursor to the surface of the blanket; and
a moving part moving the injection part in the width direction from the first side to the opposite second side of the surface of the blanket; or
a moving part moving the injection part in the length direction from the first side to the opposite second side of the surface of the blanket.

8. The method of claim 1, wherein, in the step (d), the blanket in which the silica sol precursor is gelated is aged at a temperature of 70° C. for 50 minutes.

9. The method of claim 1, wherein, in the step (d), the blanket in which the silica sol precursor is gelated is maintained at room temperature for 10 minutes to perform the aging.

10. The method of claim 1, wherein, in the step (e), the coating solution is prepared by mixing ethanol with ammonia water ($NH_4OH$).

11. The method of claim 1, wherein, in the step (e), the amount of the coating solution injected is 1.6 times the amount of the silica sol injected into the surface of the blanket in the step (c), and the aging is performed at a temperature of 70° C. for one hour in a reaction vessel to modify the surface of the blanket by using hexamethyldisilazane (HMDS).

12. The method of claim 1, wherein the step (f) comprises a first drying step of injecting carbon dioxide at a rate of 70 L/min for ten minutes under environments of a temperature of 28° C. and a pressure of 70 bar to dry the blanket of which the surface is modified, a second drying step of raising to a temperature of 50° C. for 1 hour and 20 minutes to dry the blanket, a third drying step of injecting carbon dioxide at a rate of 0.7 L/min for 20 minutes under a temperature of 50° C. and a pressure of 150 bar to dry the blanket again, and a fourth drying step of injecting carbon dioxide at a rate of 0.7 L/min for 20 minutes after breaking for 20 minutes to dry the blanket.

13. The method of claim 12, wherein, in the third drying step of the step (f), the ethanol generated from the sheet of which the surface is modified is collected while injecting the carbon dioxide.

14. The method of claim 12, wherein the step (f) further comprises a step of discharging the carbon dioxide out of the reaction vessel through a discharge hole in the reaction vessel over a period of 2 hours after the fourth drying step.

15. The method of claim 1, wherein the steps (d), (e), and (f) are performed in a reaction vessel accommodating the blanket.

16. The method of claim 2, wherein the silica sol precursor is injected through the injection device to a surface of the blanket inserted into the fixing vessel.

* * * * *

UNITED STATES PATENT AND TRADEMARK OFFICE
CERTIFICATE OF CORRECTION

PATENT NO. : 10,737,231 B2  
APPLICATION NO. : 15/738495  
DATED : August 11, 2020  
INVENTOR(S) : Kim et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 169 days.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*